Sept. 10, 1963  W. A. SCHEUBLEIN, JR., ET AL  3,103,377
ADJUSTABLE BALL JOINT
Filed Aug. 25, 1958  3 Sheets-Sheet 1
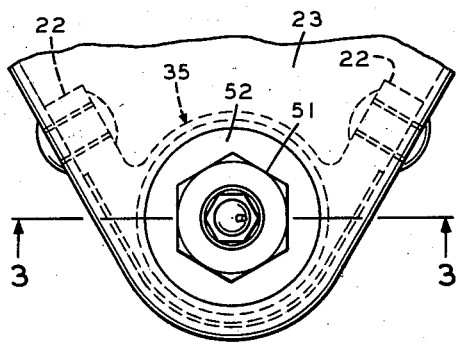
FIG. 4
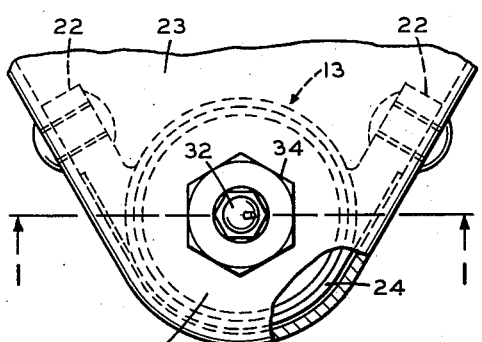
FIG. 2
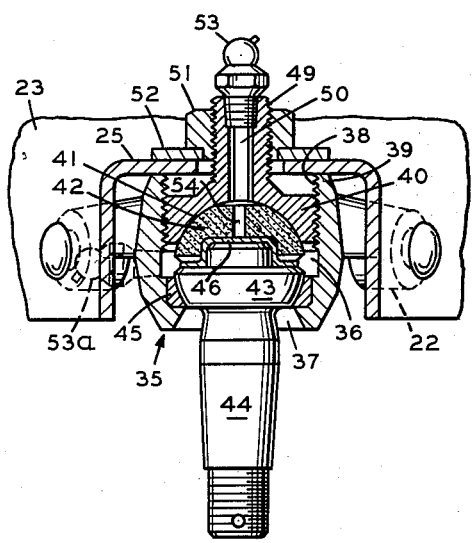
FIG. 3
FIG. 1
*INVENTORS*
WILLIAM A. SCHEUBLEIN, JR.
JANIS DUMPIS
BY
*Gravely, Lieder & Woodruff*
ATTORNEYS

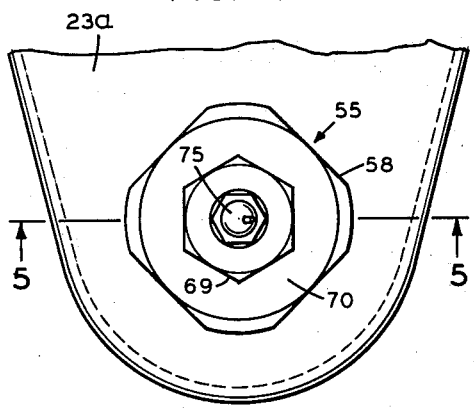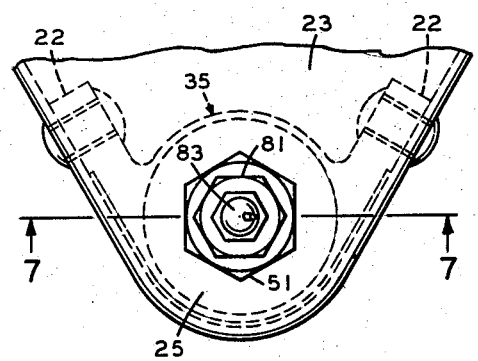

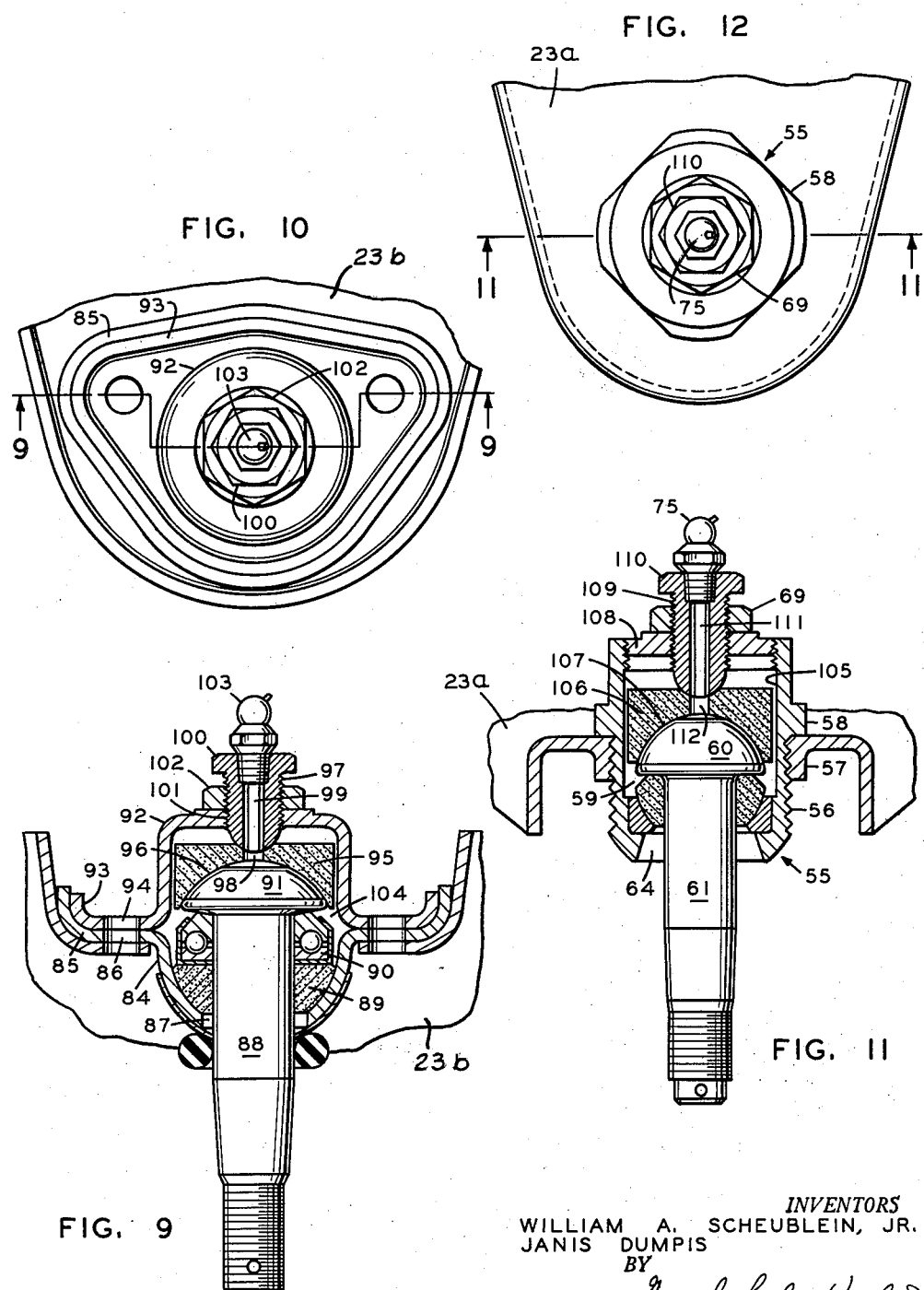

United States Patent Office 3,103,377
Patented Sept. 10, 1963

3,103,377
ADJUSTABLE BALL JOINT
William A. Scheublein, Jr., St. Louis, and Janis Dumpis, Overland, Mo., assignors to Moog Industries, Inc., St. Louis, Mo., a corporation of Missouri
Filed Aug. 25, 1958, Ser. No. 756,988
1 Claim. (Cl. 287—90)

This invention pertains to improvements in ball joints wherein adjustment of the parts is provided for while in assembled position.

A general object of this invention is to provide a ball joint for vehicles in which the features of construction enabling the same to be adjusted differ in certain respects from the ball joint assembly described and claimed in our prior application for patent bearing Serial Number 694,287 and filing date of November 4, 1957, and now Patent No. 2,954,993.

The problems in the application of ball joints to vehicles and the advantages for incorporating features of adjustment have heretofore been set forth in our said prior application, and a more specific object of this invention is to provide a mode of adjustment which is a further improvement thereof so as to extend the uses of ball joints to meet the requirements of the various vehicles now in service or to be forthcoming.

This invention consists in providing a body structure to receive the usual headed stud and to construct the adjustable parts for more facile manipulation in service. The invention also consists in such parts and components as will be more particularly described and claimed herein in reference to the accompanying drawings, wherein:

FIG. 1 is a sectional elevational view of an adjustable ball joint assembly seen along line 1—1 in FIG. 2 and exhibiting the features of the invention;

FIG. 2 is a plan view of the assembly of FIG. 1 wherein the mounting thereof on a control arm of a vehicle suspension system is illustrated;

FIG. 3 is a sectional elevational view of another form of adjustable ball joint assembly seen along line 3—3 in FIG. 4 and incorporating the adjustable features of this invention;

FIG. 4 is a plan view of the ball joint assembly shown in FIG. 3 and shows the mounting thereof in a wheel suspension arm;

FIG. 5 is a sectional elevational view of a further form of adjustable ball joint assembly adapted for threaded mounting in a wheel suspension arm, the view being taken at line 5—5 in FIG. 6;

FIG. 6 is a top plan view of the assembly shown in FIG. 5;

FIG. 7 is a sectional elevational view of still another ball joint assembly seen at line 7—7 in FIG. 8 to show an adjustment which varies from the assemblies shown in FIG. 1, 3 or 5;

FIG. 8 is a plan view of the ball joint assembly of FIG. 7;

FIG. 9 is a sectional elevational view of a ball joint assembly seen at line 9—9 in FIG. 10 and having an arrangement of adjustable parts differing from the assembly of FIG. 7;

FIG. 10 is a plan view of the assembly of FIG. 9;

FIG. 11 is a sectional elevational view of another form of adjustable ball joint assembly seen at line 11—11 in FIG. 12, wherein the same is adapted to be threadedly mounted in the vehicle wheel control arm; and FIG. 12 is a plan view of the ball joint assembly of FIG. 11.

It will be understood by those skilled in this art that the ball joint assembly to be hereinafter described and claimed is adapted for particular use in connection with a vehicle wheel suspension system of the general character disclosed in our prior application for patent Serial No. 694,287.

In FIGS. 1 and 2 the ball joint assembly 13 includes a body 14 suitably formed with an internal chamber 15 having an aperture 16 at one end and a threaded bore 17 opposed thereto. A wear ring 18 is fitted in chamber 15 adjacent aperture 16 to receive a bearing member 19, the ring and bearing having spherical mating surfaces as shown. A stud member 20 formed with a head 21 bears upon the bearing member 19 with the shank thereof extending outwardly through aperture 16 for swivelling movement and suitable connection to the vehicle wheel bracket (not shown). The body 14 is formed with integral lugs 22 (FIG. 2) which are adapted to be riveted or bolted to the suspension system control arm 23 with the end 24 of bore 17 located against the surface 25 of the arm 23 and adjacent an opening or eye in the surface 25.

The means for adjusting the assembly includes a stud head abutment plug 26 which is formed with threads to permit its adjustment in bore 17 relative to the head 21. The plug 26 has a spherical seat 27 to abut the stud head and allow working oscillation of the stud as is shown, and lubricant passages 28 in the plug connect the chamber 15 with a lubricant space 29 remote therefrom. The plug 26 is formed with an extension 30 projecting through the eye of the arm 23, and in which a square hexagonal, octagonal or other suitable tool engaging passages 31 is provided to receive a matching tool for purposes of threadedly adjusting the plug as desired. The outer open end of passage 31 is threaded to receive a lubricant fitting 32 or alternatively, the lubricant fitting may be located at 32a shown in phantom outline in a washer-like closure plate 33 for the open end 24 of the body 14. The plate 33 fits over the plug extension 30 and is covered by the arm 23 in such manner that surface 25 forms an abutment for a lock nut 34 threadedly engaged on the external threads of said extension.

The improvement in the ball joint assembly resides in the provision of easily reached adjustment and locking means. The adjustable plug may be turned with a suitable tool inserted in the passage 31 to correct for looseness at the stud head 21. While holding the adjusted position of said plug 26, the lock nut 34 may be threaded down on surface 25 to frictionally lock the plug threads against the threads of bore 17. This is accomplished, since closure plate 33 binds on the threads in bore 17 and maintains a thread locking pull or thrust at the plug extension 30.

The ball joint assembly of FIGS. 3 and 4 is mounted similarly to the assembly of FIGS. 1 and 2 and like parts have similar reference numerals. In this form of assembly, body 35 provides a chamber 36 having an aperture 37 at one end and an opposite threaded bore 38 open at end 39 to receive an adjustment plug 40. Plug 40 is formed with a spherical seat 41 which abuts a similar surface on a bearing member 42, and the member 42 engages the head 43 of stud 44. Head 43 bears upon a ring bushing 45 seated in the body 35 adjacent aperture 37. A suitable wear cap is disposed on the stud head 43 beneath the bearing member 42. In mounting the body 35 in the suspension control arm 23, the open end 39 of the body abuts the arm surface 25 adjacent an aperture or eye therein through which the extension 49 of plug 40 extends. The extension 49 is formed with a tool engaging passage or bore 50 similar to passage 31 in the above described plug extension of FIG. 1. Adjustment of plug 40 is effected by a suitable tool inserted in passage 50, and such adjustment is secured by the lock nut 51 engaging the external threads of the plug extension and abutting a plate-like washer 52, whereby the plug threads and the mating body threads in bore 38 are frictionally secured against relative turning.

Lubrication of the assembly of FIG. 3 is obtained by a fitting 53 threaded in the outer end of tool passage 50 to direct the lubricant to a passage 54 in the bearing member 42 and into chamber 36. Alternatively, the fitting 53 may be located at 53a shown in phantom outline in FIG. 3 so that lubricant enters chamber 36 directly. In the alternate arrangement, a suitable plug closure (not necessary to show) is inserted in the plug extension, and the same provision applies in FIG. 1.

Turning to FIGS. 5 and 6, the adjustable ball joint assembly includes a body 55 formed with external threads 56 for mounting the body in the receiving eye 57 of the control arm, 23a. The body, 55 is formed with a tool engaging base portion 58 to permit such threaded assembly. Body 55 provides a chamber 59 to receive the head 60 of a stud 61 upon a bearing member 62 swivelly received in a ring member 63 seated adjacent the open end 64 of the chamber 59. The opposite end of the body 55 is formed with a threaded bore 65 to receive a threaded plug 66 having the elongated threaded extension 67 formed with a suitable tool engaging passage 68 therein. Adjustment of the plug is made as previously described for the other forms of these devices, and the same is locked by a nut 69 threaded on the extension 67 to abut the plate-like closure 70 over the open end 71 of the bore 65 so that the nut 69 bearing down on the closure maintains a thrust on the plug 66 to frictionally engage the mating threads in the body bore 65 and retain the spherical seat surface 72 thereof in adjusted relation with the stud head 60. In this assembly the space 73 between closure 70 and the plug 66 forms a lubricant reservoir which communicates with chamber 59 through one or more passages 74 in the plug. A suitable lubricant fitting 75 is mounted in passage 68 of the plug extension. Alternatively, such fitting, may be disposed in the closure 70 or in the body 55, as shown in FIGS. 1 and 3 in phantom outline.

FIGS. 7 and 8 illustrate a form of ball joint assembly in general similar to that shown in FIGS. 3 and 4 and like parts are designated by like numerals of references so that the following description will point out the parts which differ therefrom. In this form the head 43a of stud 44 is swivelly received in the ring member 45 but the head is formed with a spherical socket 76 to receive the similarly formed end 77 of the adjustable plug 78. The plug is threadedly mounted in a plate-like member 79, in turn, threaded in the body bore 38 to close the lubricant space 36 therein. The plug 78 is formed with an extension 80 extending through the eye in arm 23, and having a tool engaging head 81 thereon which is exposed above the locking nut 51. In this form, the passage 82 in the plug is a plain bore to receive lubricant from the end fitting 83 screw mounted in the head 81. Alternatively, a suitable plug may be inserted in place of the fitting 81 and such fitting disposed in the side wall of body 35 in the manner indicated in phantom at 53a in FIG. 3. Adjustment of the present assembly is made at the plug head 81 and at lock nut 51 to exert a thrust on the plug threads to frictionally secure the same in closure 79 and to likewise secure the member 79 in the body bore 38. While the plug 78 and member 79 are separately manufactured, these parts serve the same function as the one-piece plug 40 of FIG. 3.

The form of ball joint assembly shown in FIGS. 9 and 10 may be manufactured as a stamping, pressing or casting to provide a body 84 having a mounting flange 85 with bolt or rivet apertures 86 therein, and an aperture 87 for a stud 88. The body carries a pressed metal type bearing block 89 and an anti-friction bearing device 90 to swivelly and rotably support the stud head 91. The body is provided with a closure 92 having a mounting flange 93 adapted to connect to the flange 85 at apertures 94. The closure 92 carries the adjusting means for the stud 88, and such means includes an axially and laterally movable plug 95 having a seat surface 96 matching the stud head 91 and a plug thrust element 97 abutting the plug 95 at a lubricant passage 98 which connects with a similar passage 99 in element 97. The thrust element extends outwardly of the closure 92 and is formed with a tool engaging head 100 so that it may be threadedly adjusted in the aperture 101. A lock nut 102 is provided to secure the desired adjustment of the plug and thrust element. Lubrication is provided through a fitting 103 in passage 99, or the fitting may be located at other places on the closure or the body, as will be understood from the disclosures hereinbefore described, to supply lubricant to the operating parts in chamber 104.

The assembly above described is adapted to have its flanges 85 and 93 connected to the surface 47 of a control arm 23b by suitable bolts, rivets, or the like in the aligned apertures 86 and 94. The assembly is carried by the suspension control arm 23b in the manner shown, that is with the assembly adjacent the enlarged eye in the control arm.

The ball joint assembly of FIGS. 11 and 12 is generally like that shown in FIGS. 5 and 6, and like parts will have similar reference numerals. This form of device embodies adjustment parts which are like those shown in FIG. 9. For example, the plain bore 105 of the body 55 houses an axially and laterally movable plug 106 having a seat surface 107 matching the stud head 60. The body closure 108 carries a plug thrust element 109 threaded into the closure and locked by the nut 69. Element 109 is formed with a tool engaging head 110 and a lubricant passage 111 which communicates with a passage 112 in the plug 106 to supply lubricant from the fitting 75 to the body chamber 59. However, the fitting 75 may, as heretofore described, be positioned in the closure 108 or side wall of the body 55.

The embodiments of the invention described herein disclose especially economical construction features for ball joint assemblies or movable joint devices in which simple stampings, pressings, or castings are combined with turned parts to simplify the manufacture thereof. The arrangements described permit easy and positive on-the-vehicle adjustment since the parts which have relative displacement are exposed and may be reached with ease. The adjustment provisions make such devices highly advantageous to mechanics who may overcome manufacturing tolerance build-up in the several parts which may vary from positive to negative increments in the same assembly. Other advantages will be readily apparent to those skilled in this art after understanding the principles of the present disclosure.

The several forms of the invention may be varied in certain respects, but it is understood that all such variations are to be included which come within the scope of the appended claim.

What is claimed is:

In an adjustable ball joint device attached to the control arm of a vehicle wheel suspension assembly in position to be accessible for adjustment while on the control arm, the control arm having an aperture therethrough from one side to an opposite side, a socket having an enlarged interiorly screw threaded bore in an end portion thereof opening at one end and having a reduced diameter aperture opening axially at the other end thereof with said one end engaging said one side of the control arm, said socket having a bearing surface therein adjacent to and circumscribing said reduced diameter aperture, a stud having an enlarged head end operatively mounted within said socket and engaged upon said bearing surface in said socket and with a shank of the stud extending through said reduced diameter aperture in spaced relation thereto to allow for angular swing of the shank with respect to the aperture, said enlarged head end also having a hemispherical bearing surface axially opposite said shank, said socket having said bore opening aligned with said control arm aperture, a stem having exterior screw threads thereon extending outwardly from the interior of said socket through said control arm aperture and accessible from said opposite side of said control arm, an adjustable exteriorly screw threaded plug integral with said stem and in engagement with the screw threads within said socket bore, said plug being provided with a concave seat substantially complemental in size and shape with the said hemispherical bearing surface of said enlarged head to permit relative movement therebetween during angular swing of the said shank, the threaded portion of said stem being of considerably less diameter than said threaded plug, said plug retaining said stud head end upon said first mentioned bearing surface and being axially movable in said socket in response to movement of said stem, thereby to allow for adjusting the engagement of the first mentioned bearing surface relative to the enlarged head, a threaded element engaged with the exterior screw threads on said stem and bearing against said opposite side of the control arm and permitting thrust reaction from said control arm to retain said stem and the integral plug therewith in adjusted position relative to the said head, and means connecting said socket to the control arm.

References Cited in the file of this patent

UNITED STATES PATENTS

| | | |
|---|---|---|
| 1,829,964 | Randall | Nov. 3, 1931 |
| 1,904,126 | Donaldson | Apr. 18, 1933 |
| 2,095,381 | Donaldson | Oct. 12, 1937 |
| 2,676,045 | Moskovitz | Apr. 20, 1954 |
| 2,797,930 | Booth | July 2, 1957 |
| 2,848,260 | Moskovitz | Aug. 19, 1958 |
| 2,876,030 | Booth | Mar. 3, 1959 |
| 2,900,196 | Nienke | Aug. 18, 1959 |

FOREIGN PATENTS

| | | |
|---|---|---|
| 949,690 | France | Sept. 6, 1949 |